United States Patent [19]

Binder et al.

[11] Patent Number: 4,989,996
[45] Date of Patent: Feb. 5, 1991

[54] LINEAR BALL BUSH

[75] Inventors: Manfred Binder, Schweinfurt; Karl-Heinz Reuss, Unterelsbach; Rainer Hofling, Arnstein, all of Fed. Rep. of Germany

[73] Assignee: Deutsche Star GmbH, Schweinfurt, Fed. Rep. of Germany

[21] Appl. No.: 499,897

[22] Filed: Mar. 27, 1990

[30] Foreign Application Priority Data

Mar. 31, 1989 [DE] Fed. Rep. of Germany ....... 3910456

[51] Int. Cl.5 ............................................. F16C 29/06
[52] U.S. Cl. ......................................... 384/43; 384/49
[58] Field of Search ............................... 384/43–45, 384/49, 507–511

[56] References Cited

U.S. PATENT DOCUMENTS

| 3,532,401 | 10/1970 | McKee | 384/509 |
| 4,511,188 | 4/1985 | Walter et al. | 384/43 |
| 4,545,626 | 10/1985 | McCloskey | 384/43 |
| 4,927,273 | 5/1990 | Mottate | 384/43 |
| 4,929,095 | 5/1990 | Osawa | 384/45 |

FOREIGN PATENT DOCUMENTS

| 43680 | 3/1908 | Fed. Rep. of Germany . |
| 1194649 | 6/1965 | Fed. Rep. of Germany . |
| 2626399 | 12/1977 | Fed. Rep. of Germany . |
| 7835003 | 2/1979 | Fed. Rep. of Germany . |
| 2075227 | 10/1971 | France . |
| 2255497 | 7/1975 | France . |
| 2291407 | 6/1976 | France . |
| 2335727 | 7/1977 | France . |
| 2346596 | 10/1977 | France . |
| 2174153 | 10/1986 | United Kingdom . |

Primary Examiner—Thomas R. Hannon
Attorney, Agent, or Firm—Brumbaugh, Graves, Donohue & Raymond

[57] ABSTRACT

A linear ball bush, wherein at least one straight ball row of a ball circuit bears radially outwardly against a running plate, which is inserted in an associated aperture of a cage and possesses an outer face for bearing against an inner circumferential surface of a bearing housing bore seating the cage, is filled in the manner that the balls, with the running plate tilted at one end out of the aperture, are introduced via a filling slope at the open end of the aperture and/or a filling chamfer at the outwardly tilted end of the running plate into a straight portion of a track, and that after the balls of the ball circuit have been completed, the running plate is tilted back into an operating position and is secured in the operating position.

10 Claims, 12 Drawing Sheets

LINEAR BALL BUSH

BACKGROUND OF THE INVENTION

The invention relates to a linear ball bush comprising a cage with a cage axis and with a plurality of ball circuits.

In such a linear ball bush the problem exists of charging the balls into the respective ball circuit. This problem can be solved by way of example in a manner in which after the installation of the track plates the balls are pressed through radially outwardly open slots of the cage into the respective return ball row. Another possible solution consists in that before the installation of the track plate in each case the balls are charged into the respective ball circuit, and the track plate is fitted only subsequently.

STATEMENT OF THE PRIOR ART

In German Utility Model Specification No. 7,835,003 a linear ball bush is described in which apertures are situated in the cage material to both sides of the cage lips which radially inwardly secure the carrier ball row, namely close to one axial end of the carrier ball row. The lips are made yieldable by these apertures. The balls can then be pressed from the interior outwards into the carrier ball row with an automatic charging device. Since the introduction of the balls takes place from the internal space of the cage, but this internal space is limited according to the shaft diameter in each case, a complicated charging tube with a plurality of deflection bends must be used. Due to the springing open of the lips in the charging of the balls the danger exists that pressure points may occur there which interfere with the running of the balls.

OBJECT OF THE INVENTION

The invention is based upon the problem, in a linear ball bush of the initially designated kind, of facilitating the introduction of the balls and especially of rendering possible the use of an automatic charging device, and in doing so of reducing or avoiding the danger of an interference with the ball circulation in operation.

SUMMARY OF THE INVENTION

A linear ball bush comprises a cage with a cage axis and with a plurality of ball circuits. Each ball circuit comprises two straight ball rows substantially parallel to the cage axis, namely a carrier ball row and a return ball row, and two curved ball rows connecting the straight ball rows. At least one straight ball row of a ball circuit rests radially outwards on a track plate which is inserted into a pertinent aperture of the cage and possesses an outer surface for abutment on an internal circumferential surface of a bearing housing bore accommodating the cage. A straight track section for at least one straight ball row of the respective ball circuit is formed on an inner face of the track plate. The respective carrier ball row radially inwardly partially penetrates a slot of the cage, in order to be able to abut on a shaft at least partially enclosed by the cage.

The aperture of the cage possesses a filling slope at least at one of its ends and approximately in alignment with the one straight track section, and/or the runner plate possesses a filling bevel in the region of at least one of its ends, in approximate alignment with the one straight track section. This filling slope and/or this filling bevel permit the filling of balls into the one straight track section when the runner plate is wholly or partially lifted out of the aperture at this one end.

In the formation in accordance with the invention the track plates need to be tilted out at their end facing the filling point in each case only by a small amount so that the balls positively come into order in filling. The distance between the bottom of the track in each case and the runner plate remains so small that it is not possible for two balls to slide one over the other and jam one another. Thus it is ensured that the balls are introduced in the correct number into the ball circuit in each case and that the runner plates can then be hinged back into the operational position.

In order to facilitate the automatic fitting of the linear ball bush and to avoid incorrect orientations of the cage and/or the runner plates, it is further proposed that filling slopes are provided at both ends of the aperture and/or that filling bevels are provided at both ends of the runner plate, on the inside thereof.

The idea of the invention is applicable, irrespective of whether only one straight track section or a closed track is formed on the inner face of the runner plate.

If only one carrier track section is fitted for the carrier ball row on the inner face of the runner plate, the filling slope and/or the filling bevel is fitted in alignment with this carrying straight track section.

If on the other hand a closed track is formed on the inner face of the track plate, with a carrying straight track section for the carrying ball row and with two curved track sections connecting the two straight track sections, then it is advisable for the filling slope and/or the filling bevel to be arranged in axial alignment with the returning straight track section, because in the returning straight track section as a rule the balls possess greater freedom of guidance and especially because the returning straight track sections, in relation to the axis of the cage, is laid radially further outwards, so that a filling is already possible with a smaller tilt-out angle of the runner plate.

For reasons of manufacturing technique in the production of the runner plates it is advisable for rectilinear prolongations of the straight track sections to be continued with substantially constant profile as far as the ends of the runner plate, intersecting with the curved track sections. These rectilinear prolongations of the straight track section to be filled in each case, in combination with the filling slope or the filling bevel, bring a further facilitation of the filling of the balls.

One particular advantage resides in that during the ball filling operation the end of the runner plate remote from the filling point is held approximately in the operational position within the aperture. This facilitates holding the runner plate in each case in the correct position in the filling operation.

If the runner plates are held operationally in the cage by pot-shaped end rings, then for the charging of the balls firstly it is possible to fit only one pot-shaped end ring, in order to be able firstly to hold the runner plates fast only at their ends placed remotely from the filling position and to tip them out in the ends close to the filling position. After the charging of the balls then the pot-shaped end ring close to the engagement points is fitted, after the runner plates have previously been tipped back into their operational position.

The invention further relates to a method for charging the balls into a ball circuit of a linear ball bush having a cage with an axis, in which each ball circuit comprises two straight ball rows substantially parallel to the cage axis, namely a carrier ball row and a return ball row, and two curved ball rows connecting the two straight ball rows, further in which at least one straight ball row of a ball circuit lies radially outwards against a runner plate which is inserted into a pertinent aperture of the cage and possesses an outer surface for abutment on an internal circumferential surface of a bearing housing bore accommodating the cage, further in which a straight track section for at least one straight ball row of the ball circuit concerned is formed on an inner face of the runner plate, and in which the respective carrier ball row radially inwardly partially penetrates a slot of the cage, in order to be able to abut on a shaft at least partially surrounded by the cage.

In filling here the procedure is adopted that with the runner plate tipped at one end out of the aperture the balls are introduced by way of a filling slope at the open end of the aperture and/or a filling bevel at the tipped-out end of the runner plate, into a respective straight track section and after completion of the balls of the ball circuit the track plate is tipped back into the working position and is secured in the working position.

It is pointed out that the filling slopes and the filling bevels are so dimensioned that the running of the balls is not disturbed, that is so that all necessary ball guide faces on the cage as well as on the runner plate are maintained.

The various features of the invention are discussed especially in the accompanying claims which form a part of the disclosure. For the better understanding of the invention, its working advantages and specific effects reference is now made to the accompanying drawings and the description, in which a preferred form of embodiment of the invention is discussed.

BRIEF DESCRIPTION OF THE DRAWINGS

The accompanying Figures explain the invention by reference to an example of embodiment.

DETAILED DESCRIPTION OF THE PREFERRED EMBODIMENT

Figure 1:
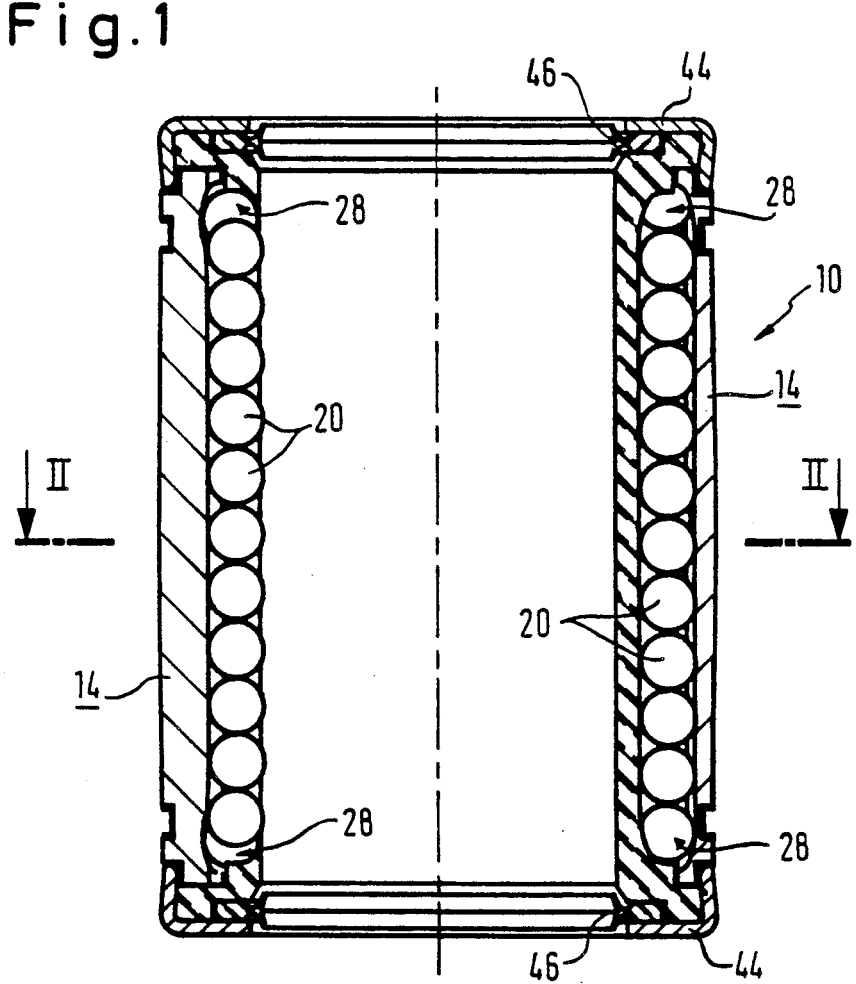
FIG. 1 represents for the illustration of the overall-technical relationships a longitudinal section through a linear ball bush according to the invention.
Figure 2:
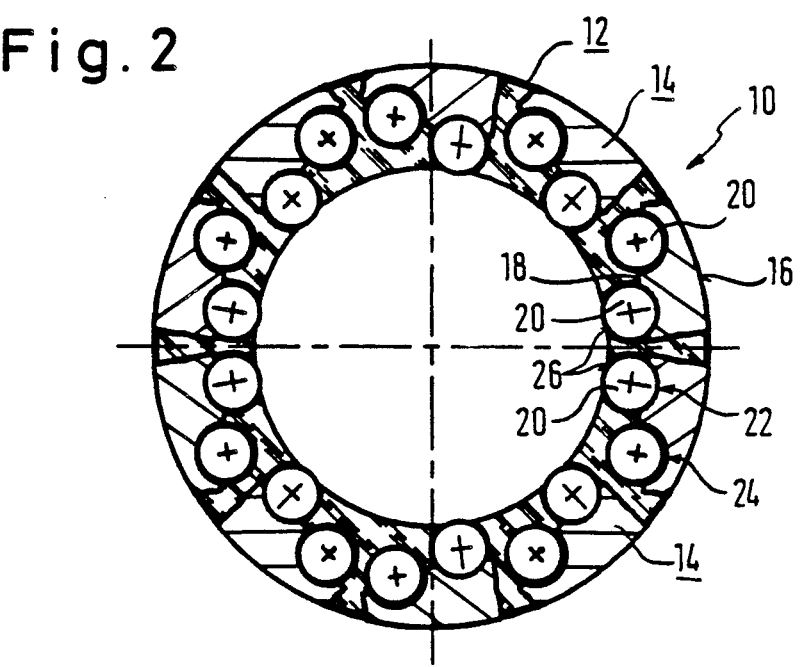
FIG. 2 represents a cross-section along the line II - II in FIG. 1.

In FIGS. 1 and 2 a linear ball bush is designated quite generally by 10. It includes a cage 12 of hard-elastic synthetic plastics material. Into this cage 12 there are inserted runner plates 14 each possessing an external circumferential face 16 for abutment on a bearing housing bore receiving the linear ball bush 10, and an internal circumferential surface 18. The runner plates 14 consist of a hard material, especially hardened steel. By the cage 12 and the runner plates 14 in each case a guide is formed for a ball circuit. The balls are designated by 20. Each ball circuit forms a carrier ball row 22 and a return ball row 24. The carrier ball rows 22 extend through slots 26 of the cage 12 radially inwards to abut on a shaft (now shown). The return ball rows 24 are radially inwardly supported by the cage 12. Both straight ball rows 22 and 24 lie against the inner circumferential surface 18 of the respective runner plate 14. The carrier ball row 22 and the return ball row 24 are in each case connected by curved ball rows 28. The runner plates 14 are held in shape-engaging manner in the cage 12, but with a certain movement play.

Figure 4:
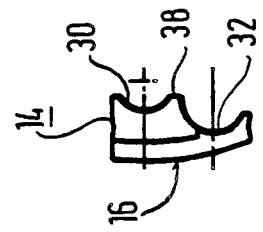
FIG. 4 represents an end view of a runner plate according to FIG. 3.
Figure 6:
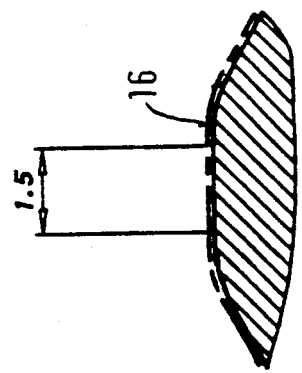
FIG. 6 represents an enlargement of the zone VI in FIG. 5, in a section corresponding to that in FIG. 5.
Figure 3:
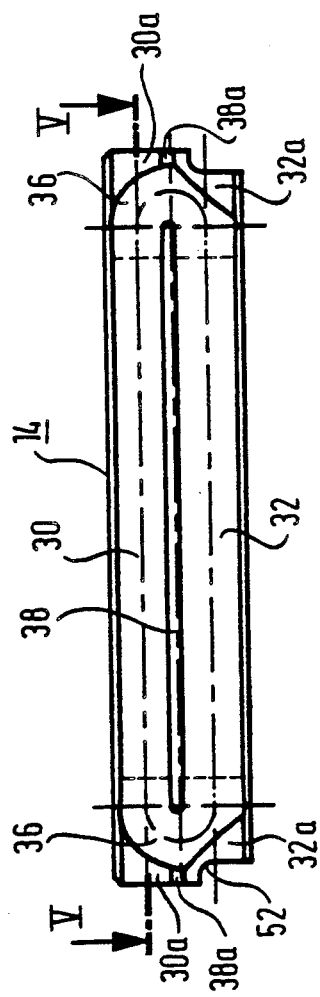
FIG. 3 represents a view of the inner side of a runner plate.
Figure 5:
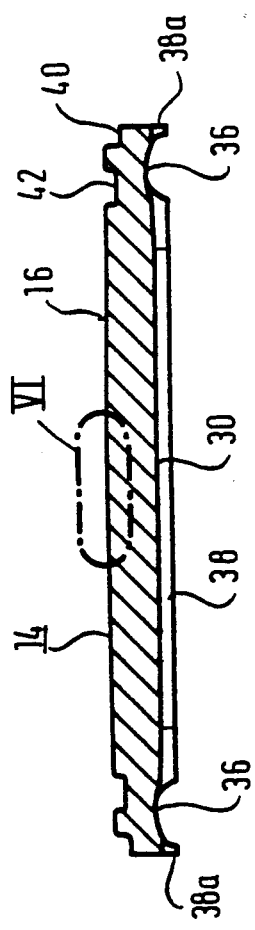
FIG. 5 represents a section along the line V—V in FIG. 3.

In FIGS. 3, 4 and 5 a runner plate 14 is illustrated individually. This runner plate 14 is produced on the basis of a profiled bar the profile of which can be seen from FIG. 4. The runner plate 14 comprises a carrier straight track section 30 which possesses a first higher level in relation to the external circumferential surface 16, and a returning straight track section 32, which possesses a lower level in relation to the external circumferential surface 16. The carrier track section 30 serves to receive the carrier ball row 22 and the straight track section 32 serves to receive the return ball row 24. The two straight track sections 30 and 32 are connected with one another by curved track sections 36. However the straight track sections 30 and 32 extend with the end sections 30a and 32a with substantially constant profile as far as the ends of the runner plate 14. Between the straight track sections 30 and 32 there lies a middle rib 38. The middle rib 38 continues with end sections 38a as far as the ends of the runner plate 14 with constant profile, and is merely interrupted by the curved track sections 36. At its external circumferential surface 16 the track plate is curved, as shown in FIG. 6, so that it comes to abut in swinging manner on the internal circumferential surface of a bearing housing bore. As may be seen from FIG. 4, the straight track sections 30 and 32 are rounded with a radius of curvature which is equal to or a little greater than the radius of the balls 20.

In FIG. 5 turned apertures 40 and 42 are seen at the ends of the runner plate. The turned apertures 40 are intended to receive pot-shaped end rings 44 (FIG. 1) which secure the runner plate 14 and closure washers 46 on the cage 12. The turned apertures 42 are intended to receive securing rings for the axial securing of the ball bush in a receiving bore.

Further details on the formation of the tracks appear from FIGS. 7 to 11. The curved track sections 36 extend over approximately 180° and are of nearly circular curvature. The drop in level from the straight track section 30 to the straight track section 32 begins as early as an end section a of the straight track section 30. Thus the floor of the curved track section 36 in the region of intersection with the straight track section 30 lies lower than an imaginary continuation of the floor of the straight track section 30, and a lateral guidance of the balls is guaranteed in this intersection zone too. The level gradient in the end section a is represented by the angle indication 2° in FIG. 8. The level gradient in the directly adjoining region of the curved track section 36 amounts to about 5°, as likewise illustrated in FIG. 8. No jumps in level occur. .The gradient transitions are rounded. The longitudinal extent of the end section a is so large, even after grinding, that the loaded balls can be continuously relieved of load before entry into the curved track section 36 This is analogously also valid for the balls entering the load zone. By this measure a uniform and Jerk-free course is guaranteed At the point 6 in FIG. 7 the curved track 36 possesses a level minimum which lies below the level of the returning straight track 32. In the end section b of the returning straight track section 32 a slow rise of level takes place. No jumps in level occur. The gradient transitions are rounded. The level minimum 6 is still present even after the grinding of the returning straight track section 32. The gradient distances a and b of the straight track sections 30, 32 are swaged together with the curved track sections 36. The tapering of the rib width of the middle rib 38 in the region of the end sections a and b results in a funnel-shaped transition of the curved track section 36 into the straight track sections 30 and 32.

Figure 7:
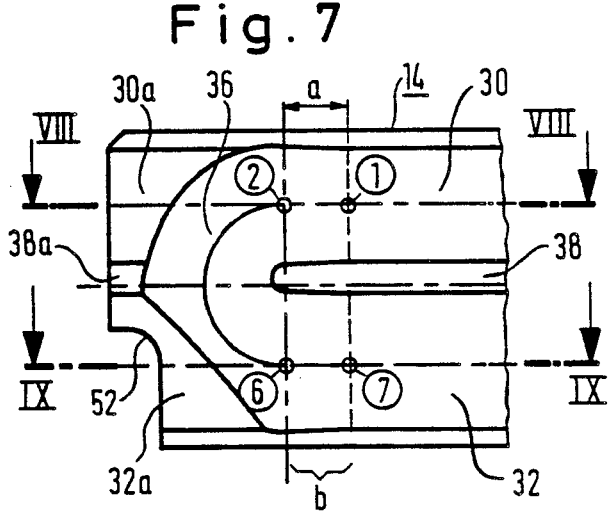
FIG. 7 represents an enlargement of an end section of the runner plate according to FIG. 3.
Figure 8:
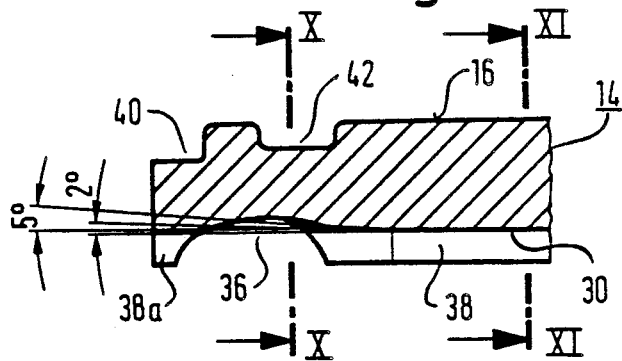
FIG. 8 represents a section along the line VIII—VIII in FIG. 7.
Figure 10:
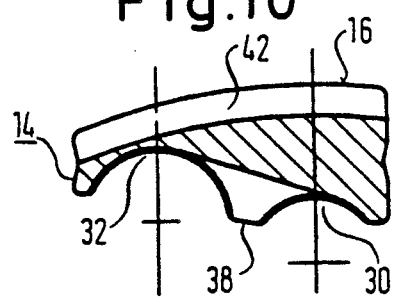
FIG. 10 represents a section along the line X—X in FIG. 8.
Figure 9:
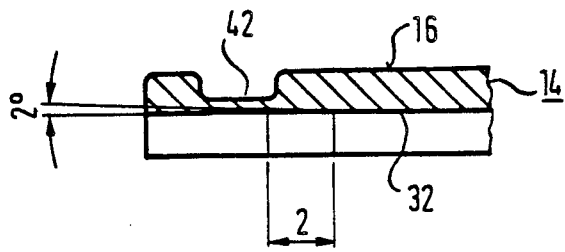
FIG. 9 represents a section along the line IX—IX in FIG. 7.
Figure 11:
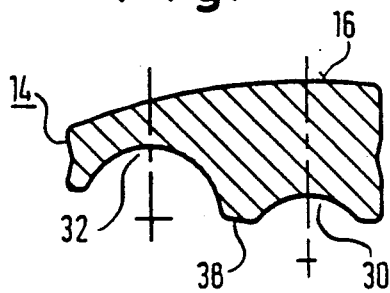
FIG. 11 represents a section along the line XI—XI in FIG. 8.
Figure 12:
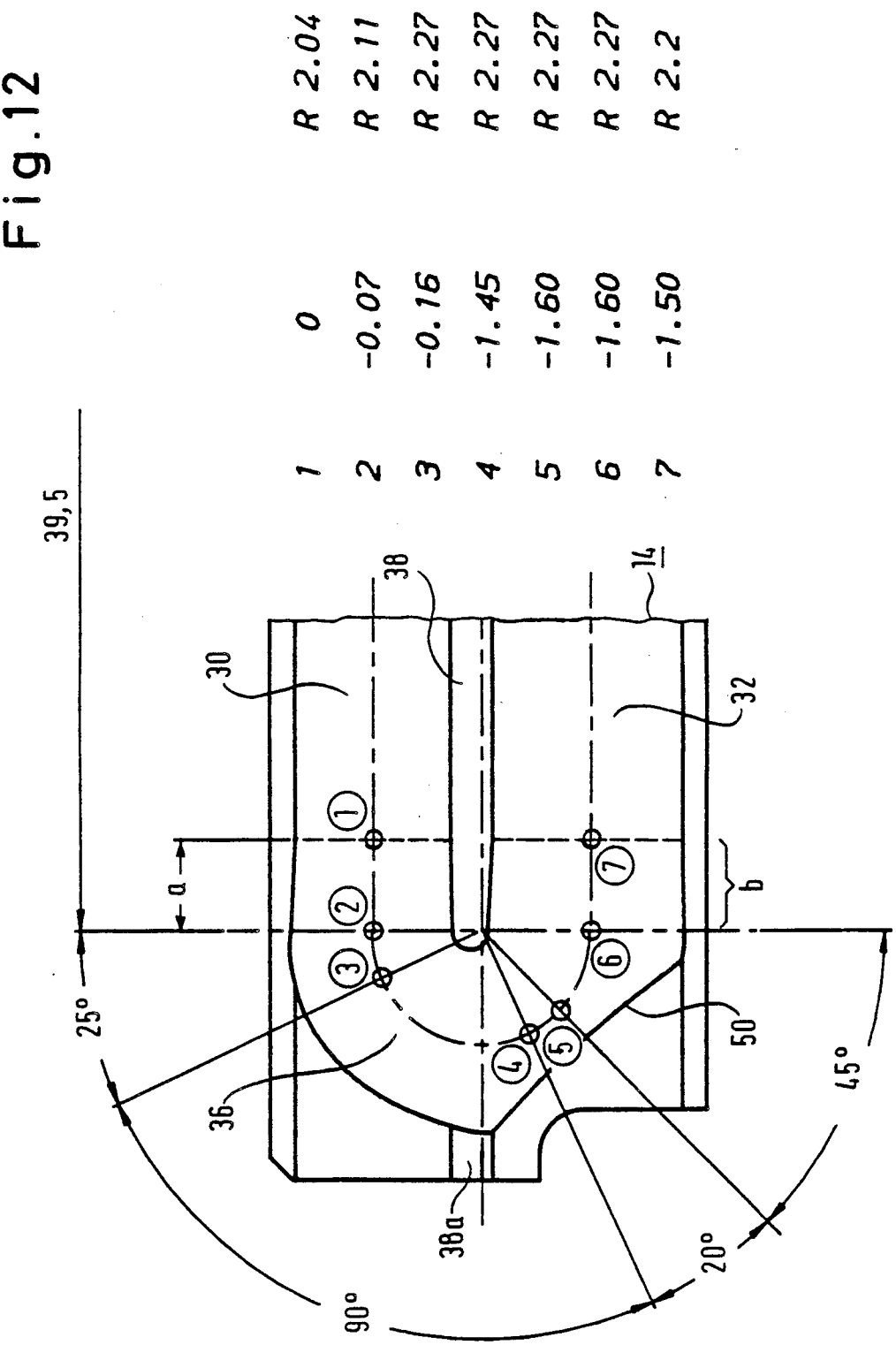
FIG. 12 represents a plan of levels with tabular listing of the floor levels of the track in an end section of the runner plate according to FIG. 7.

In FIG. 12 different measurement points, some of which were also entered in FIGS. 7 in order to clarify the relationships between FIG. 7 and FIG. 12, are designated by 1 to 7. Different level values are allocated to these measurement points, by way of example, according to the table in FIG. 12 The level values designate the relative level height in millimetres in each case on the floor of the track in relation to the floor level of the carrier track section 30, to which the value zero is allocated From the second column of the table it is readily seen that in the region 5 to 6 a minimum level is present and that starting from this minimum level a rise of level takes place to the height level of the floor of the returning straight track section 32. The reascent 6 to 7 lies substantially in the straight return line of the returning straight track section 32. Locus co-ordinates allocated to the individual points 1 to 7 are designated by the angle values in FIG. 12. FIG. 12 communicates, by the length statement 39.5 mm., an idea of order of magnitude too of the length of the ball bush. As supplement thereto let it be remarked that the external diameter of the cage 12 amounts in the case of the example to 40 mm., that in all 10 runner plates are provided, as represented in FIG. 2, that the peripheral extent of a runner plate amounts to 9.7 mm. and that the ball diameter amounts to 3.969 mm. Finally the radius of curvature of the track, measured at the floor (dot-and-dash line in FIG. 12) amounts to 2.04 mm. Finally in the table in the fourth column there are entered the radii in each case of the track sections in millimetres. It is seen that these radii are little larger than the ball radius, so that the balls are laterally guided It- is seen from FIG. 12 and the table that in the region 1 to 4 a lateral guidance is guaranteed; this lateral guidance is supplemented in the apex region 4 by the continuation 38a of the rib 38. Even in the relatively uncritical region 4 to 7 a certain lateral guidance of the balls by the runner plate is still guaranteed, as indicated by the intersection line 50. It should be mentioned once more that the individual gradient distances from 1 to 7 merge into one another substantially steadily.

The guidance of the balls is supplemented by the cage 12. The guide faces in the cage 12 are manufactured with high precision so that they adjoin the guide faces of the runner plates without stagger.

The apertures 52 which can be seen in FIGS. 3 and 7 serve in part to receive material- in the swaging of the curved track sections 36; in other words. In swaging the runner plates 14 are laid with previously formed apertures into swaging moulds which rest on the external circumferential surface 16 and the end faces, but in the region of the apertures 52 leave so much clearance that the material displaced in swaging can flow in and then the geometry of the apertures according to FIG. 7 is produced.

Figure 13:
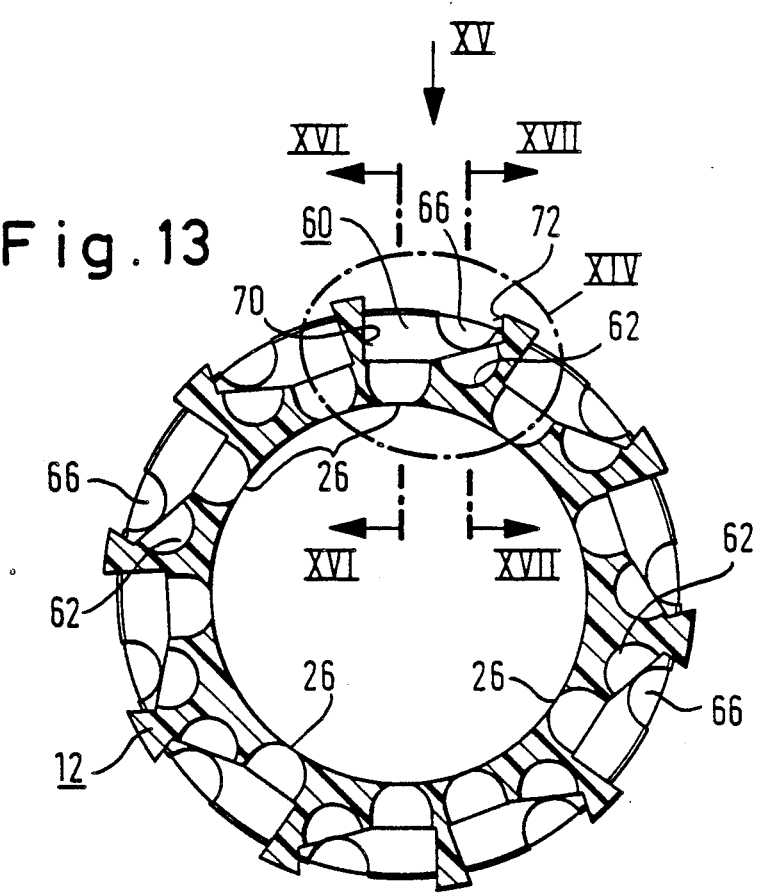
FIG. 13 represents a cross-section through a cage along the line II—II in FIG. 1, but after removal of the runner plates and balls.
Figure 14:
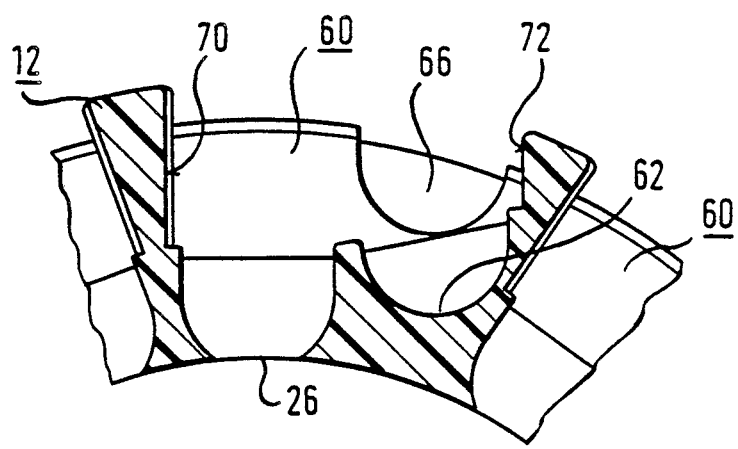
FIG. 14 represents a detail of FIG. 13 in enlarged form.
Figure 15:
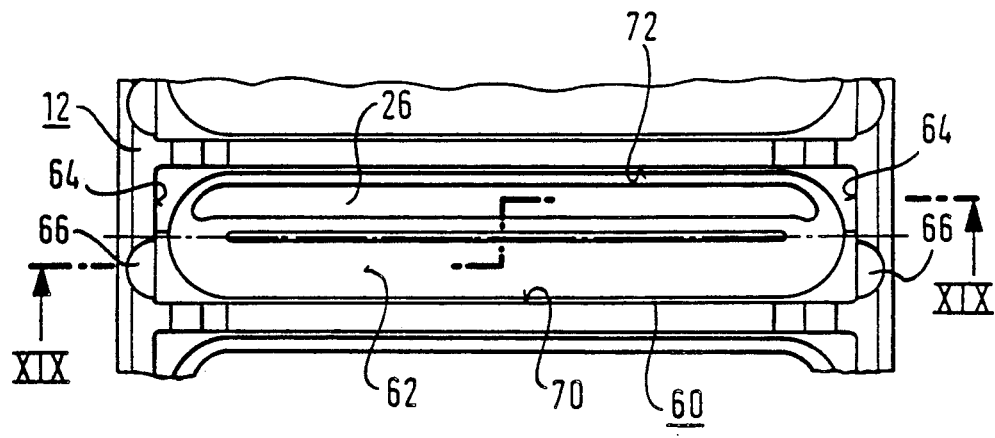
FIG. 15 represents a partial view of the cage in the direction of the arrow XV in FIG. 13.
Figure 16:
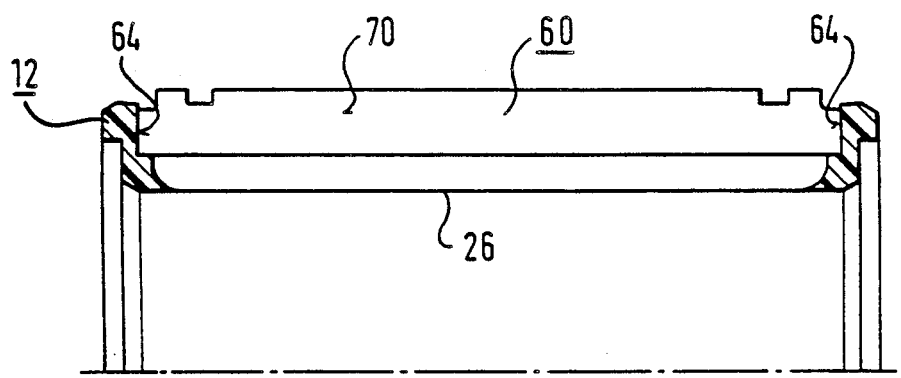
FIG. 16 represents a longitudinal section through the cage along the line XVI—XVI in FIG. 13.
Figure 17:
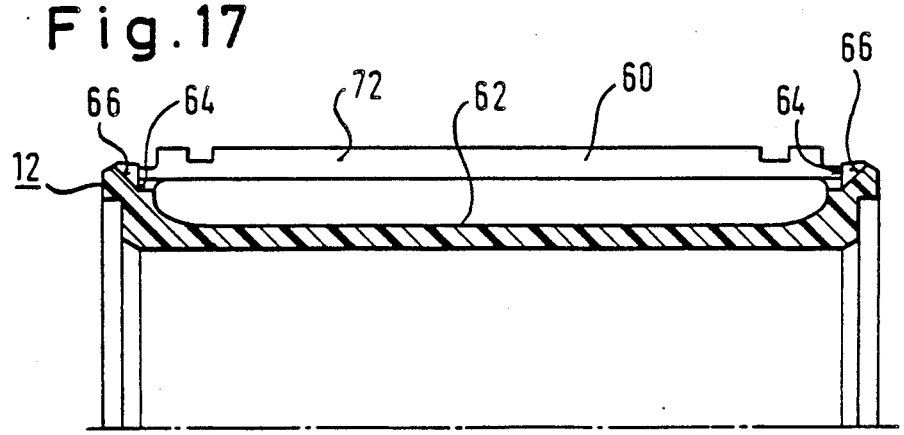
FIG. 17 represents a longitudinal section along the line XVII—XVII in FIG. 13.
Figure 18:
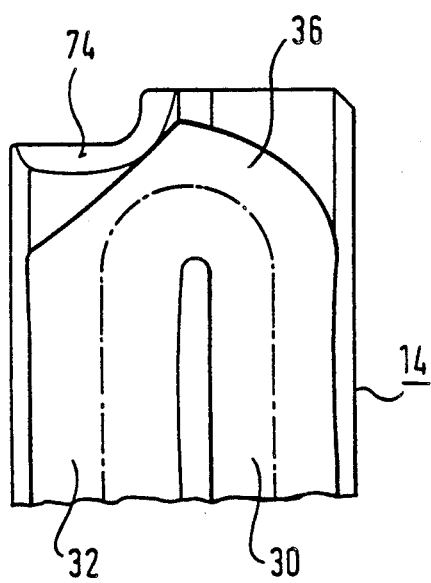
FIG. 18 represents a partial view of a runner plate according to FIG. 7, but with an end bevel.
Figure 19:
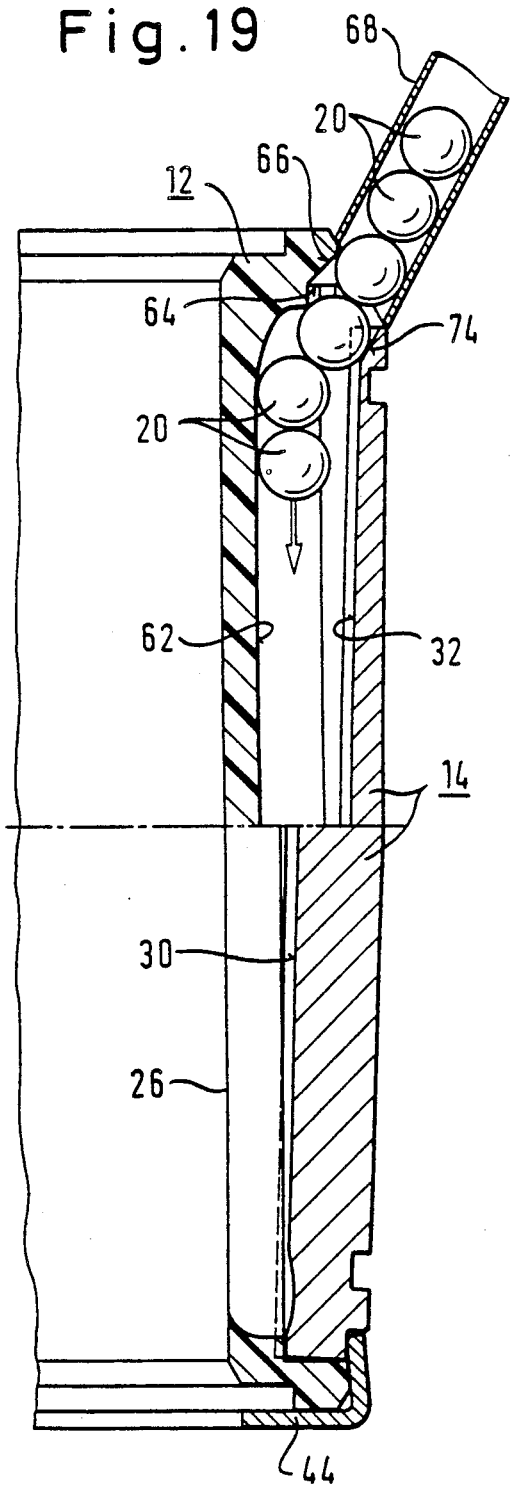
FIG. 19 represents a section along the line XIX—XIX in FIG. 15, in the charging of balls.

In FIG. 13 the cage according to FIG. 2 is represented after removal of the runner plates 14 and the balls 20. The apertures 60 for the accommodation of the runner plates 14 from FIG. 2 are seen there. One further sees the slots 26 which in part permit passage of the balls of the carrier ball row 22 and one sees the track 62 for the return ball row 24 in FIG. 2. All this is represented in enlargement in FIG. 14 too. It is further seen from FIGS. 14 and 15 that at the ends of the apertures 60, namely adjoining the end faces 64 of the apertures 60, filling slopes 66 of channel form are arranged in alignment with the tracks 62, the significance of which slopes may be seen especially from FIG. 19. There a filler pipe 68 is fitted for the charging of the balls 20 of a ball circuit, so that the pipe is approximately in continuation of the filling slope 66 in each case. In this case the upper pot-shaped end ring 44 is removed, while the lower pot-shaped end ring 44 assumes its securing position in relation to the runner plates 14. Since the upper end ring 44 is absent, the runner plate 14 can be set obliquely, as may be seen from FIG. 19, so that in the region of the -entry slope 66 it permits admission of the balls 20. The oblique placing of the runner plates 14 is possible since the longitudinal defining faces 70, 72 of the aperture 60 are approximately parallel to one another, or the synthetic plastics material of the cage 12 is elastic in such a way that a setting out of the runner plate 14 under constraint is possible The charging of the balls 20 into the track 62 of the return ball row is also facilitated by the fact that a bevel 74 is provided on the inner side of the runner plate 14, as may be seen from FIGS. 18 and 19.

It should be remarked that the nature to the charging, using the filling slope 66 and the bevel 74, is not bound to the fact that the two straight track sections 30, 32 and the curved track sections 36 are provided on the runner plate 14. The manner of filling would rather be conceivable even if the runner plates 14 were limited to the width of the straight track sections 30 of the carrier ball rows. In this case only the filling slopes 66 and the bevels 74 would have to be provided in alignment with the respective straight track section 30 of a carrier ball row.

Figure 20:
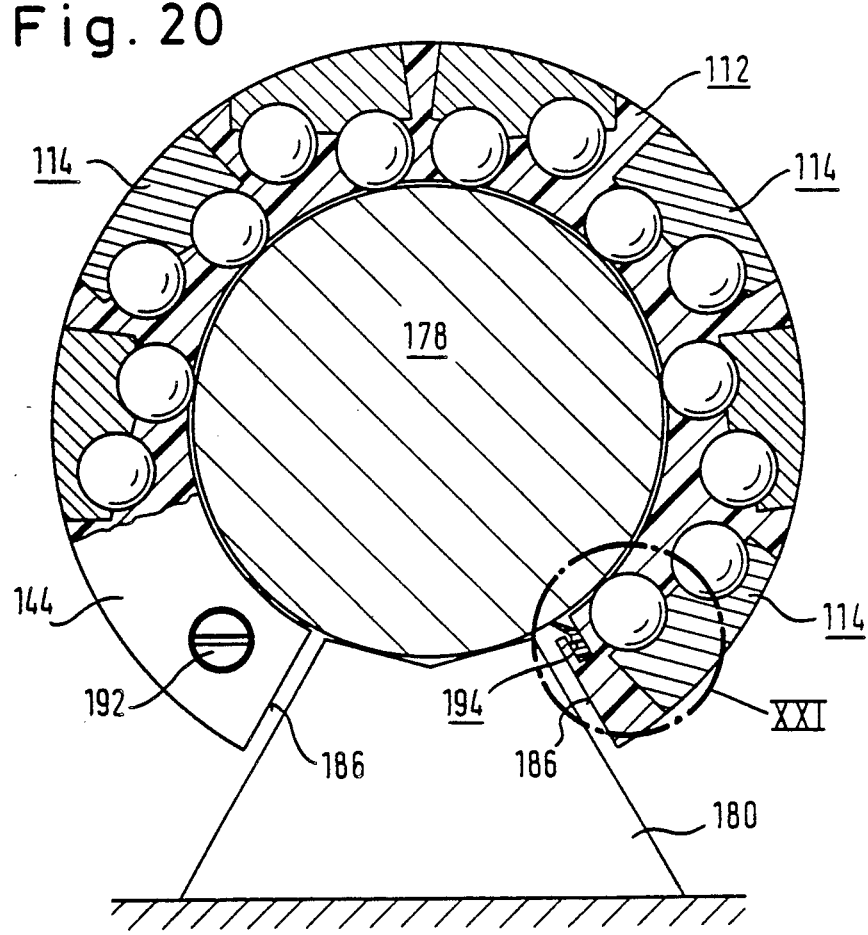
FIG. 20 represents a section through a linear ball bearing according to FIG. 1, but modified in so far as the cage is made in part ring form for the reception of a support for the shaft.
Figure 21:
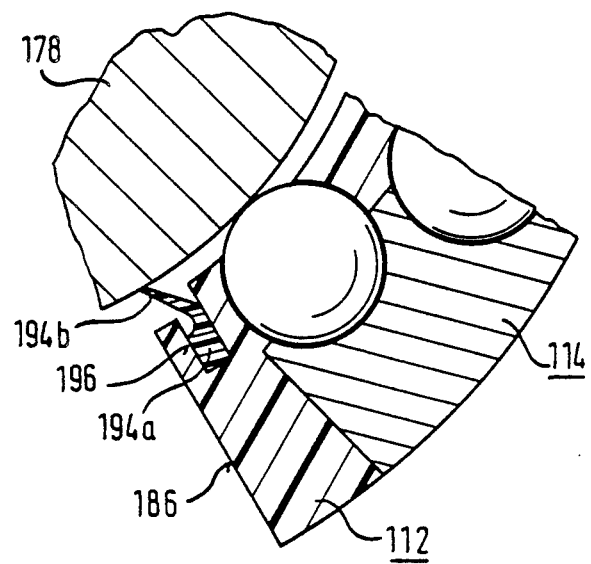
FIG. 21 represents a detail corresponding to the point XXI in FIG. 20, in enlargement.
Figure 22:
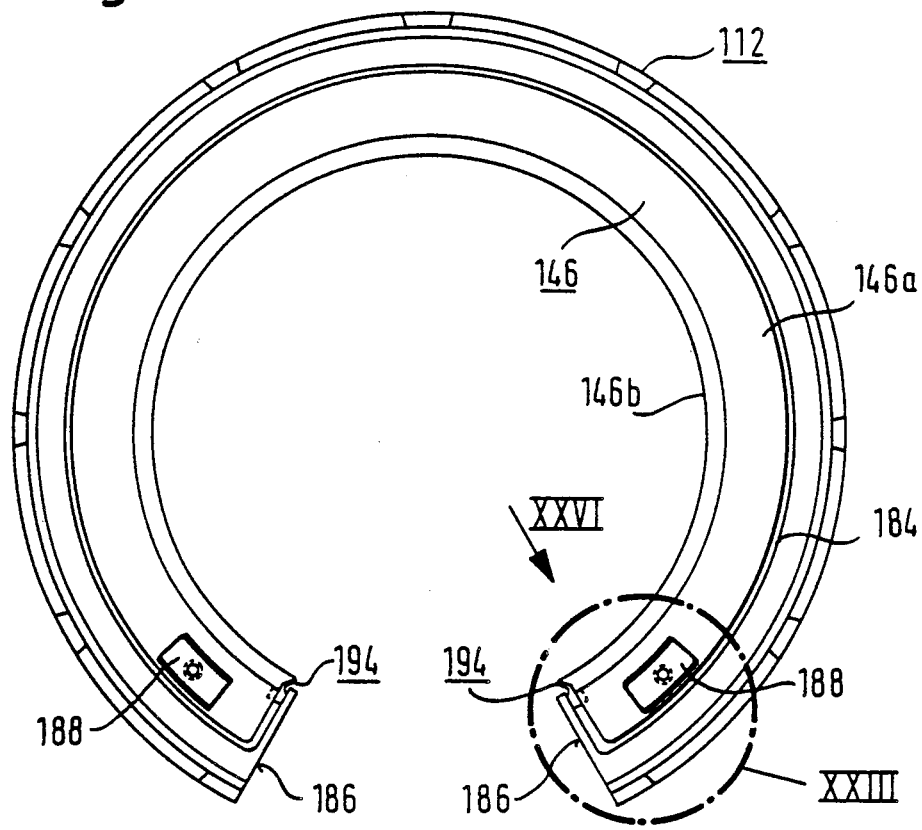
FIG. 22 represents an end view of a linear ball bearing according to FIG. 20, where a likewise part-annular, pot-ring-shaped end ring is removed.

In FIG. 20 there is seen a linear ball bearing in which the shaft 178 is supported by pedestals 180 and the cage 112 is made in part-annular form. The cage is again provided at its ends with end rings 144 which are made in part-annular form in accordance with the circumferential extent of the cage 112. Seals are provided to prevent the penetration of dirt into the region of the balls.

In FIG. 1 reference was made to the closure washers 46. There are the necessary sealing rings which are held on the cage by end rings 44 and come to abut with a sealing lip on the shaft (not shown there). These sealing rings are also needed in the form of embodiment according to FIG. 20, which is now under discussion, and these sealing rings are seen in FIGS. 22 to 25, where they are designated by 146 and are composed in each case of a basic body 1446a and a sealing lip 146b. The sealing lip 146b is here again intended to abut on the shaft 178n according to FIG. 20. The basic body 146a of the sealing ring 146 is here accommodated, as may be seen especially from FIGS. 23, 254 and 25, in an annular recess 184 of an end face 185 of the cage 112, which is defined by an axially directed face 184a and a radially inwardly directed face 184b, and is limited at its ends by end strips 184c. The basic body 146a lies with axial play between the axially directed face 184a of the cage 112 and an axially directed face 144a of the end ring 144 resting on the end face 185. The oversize of the aperture 184 compared with the diameter of the basic body 146a (FIG. 25) permits the basic body 146a radial play within the aperture 184. This radial play also exists in the form of embodiment according to FIG. 1, and there too is of essential importance, but has not there been mentioned hitherto. The radial play is necessary in order in a displacement in angle of the shaft 178 in relation to the cage 112 to render possible an adaptation of the sealing ring 146 to the altered geometry. While now in the form of embodiment according to FIGS. 1 to 13 the sealing ring 46 (there called closure washer) is closed in circular form and therefore can be movable in the.-peripheral direction without this interfering with the bearing operation, in accordance with the invention the sealing rings 146 are of part-annular form, that is open. As before the necessity still exists of permitting radial play to the sealing rings 146, in order to render possible their adaptation to modified bearing geometry in the case of loss of alignment between shaft 178 and cage 112. However the necessity exists at the same time of avoiding a twisting of the sealing rings 146, since these sealing rings 146, in the case of a twistability, could protrude beyond the one or other end face 186 of the cage (see FIG. 22) or recede behind it.

Figure 23:
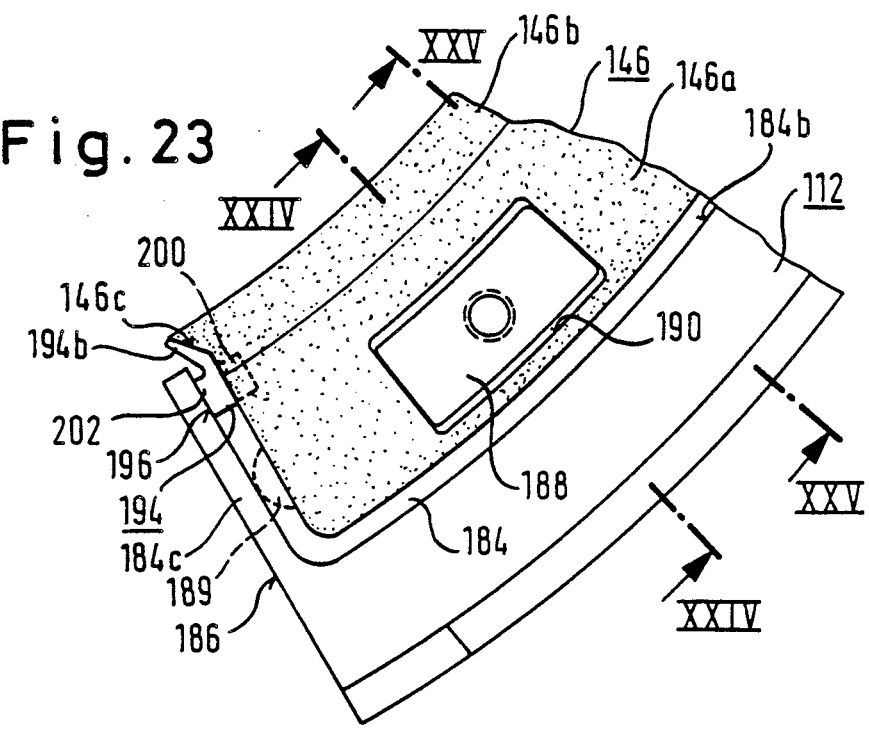
FIG. 23 represents an enlargement of the detail XXIII in FIG. 22.
Figure 24:
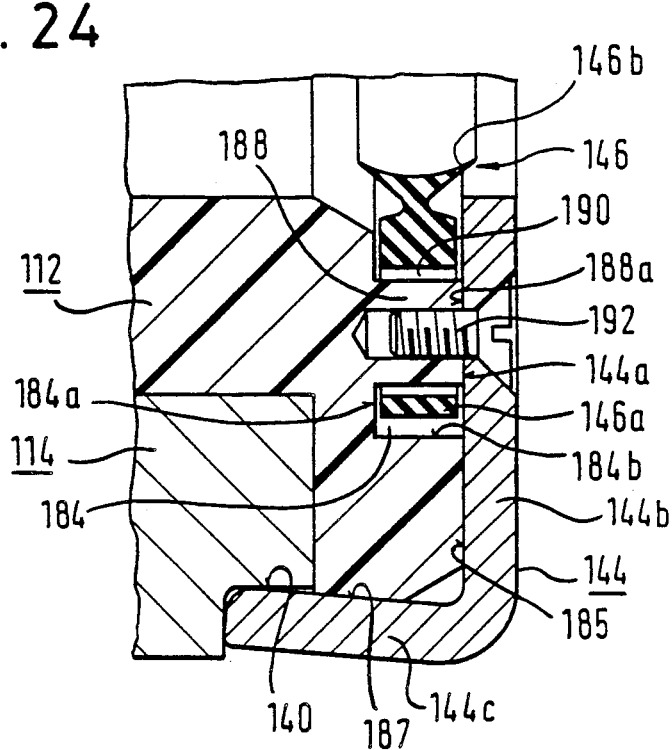
FIG. 24 represents a section along the line XXIV—XXIV in FIG. 23.
Figure 25:
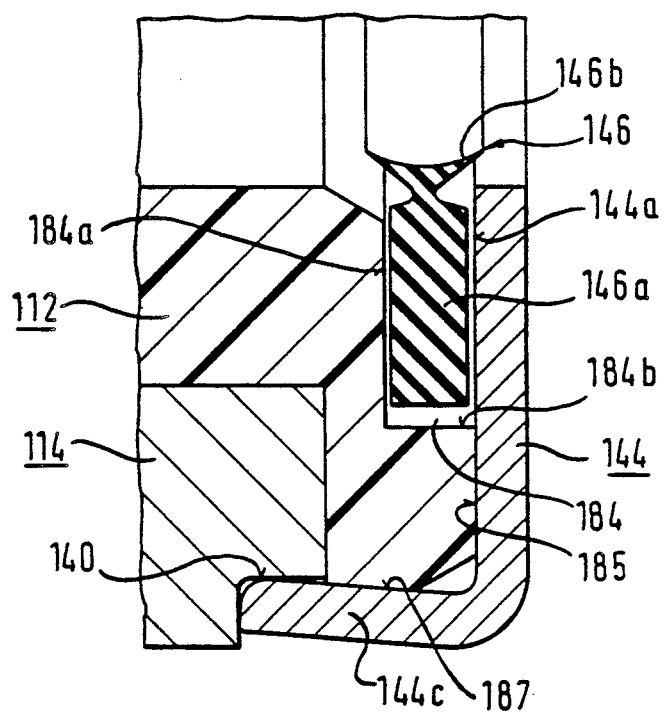
FIG. 25 represents a section along the line XXV—XXV, in FIG. 23.

In order to leave the sealing ring 146 movable in the radial direction, but to make it fast in the peripheral direction, an embodiment is foreseen as represented in detail in FIGS. 23 and 24. Above the axially directed surface 184a there rise dogs 188 which can also be seen in FIGS. 22 and 23. These dogs 188 pass through piercings 190, as may be seen from FIGS. 23 and 24. Here the piercings 190 have a radial dimensional excess over the radial width of the dogs 188, so that the sealing rings 146 again have a radial play, as before. It is here to be noted that according to FIG. 22 the dogs 188 are fitted only in the end zones of the sealing rings 146, that is close to the support bearing 180 in FIG. 20. It is further to be noted that the height of the dogs 188 opposite to the axially directed face 184a of the cage 112 is greater than the axial thickness of the basic body 146a in each case. The face 144a, that is the inner side of the pot bottom 144b of the pot-shaped end ring 144 lies against the end face 188a of the dog 188 in each case and is there screwed to the cage. The screw connection takes place by means of a countersunk screw 192 which is screwed into the dog 188. On account of the oversize of the axial height of the dog 188 compared with the axial thickness of the basic body 146, even when the countersunk screw 192 is fully tightened the basic body 144a is not clamped in between the faces 184a and 144a. Thus even to this extend the radial play of the sealing ring 146 is maintained. According to FIG. 24 it can also be seen clearly that the annular wall 144 engages in the turned recesses 140 of the runner plates 114 and rests on the bevelled outer circumferential face 187 of the cage 112, so that the runner plates 114 are held axially and radially in the cage. It is to be noted that the peripheral fastening of the annular seals can also be effected by projections 189 of the annular seals 146 against the end strips 184c (FIG. 23). Then the dogs 188 would nevertheless be needed for the fastening of the end rings 144. The dogs 188 could then however possess peripheral play in relation to the piercings 190, beside the still necessary radial play.

The sealing problem is not yet completely solved with the annular seals 146 alone. As may be seen from FIGS. 20 to 23 and 26 and 27, in the region of the gap limitation faces 186 in the cage 112 there are also provided longitudinal sealing strips 194 with a root part 194a and a tongue part 194b resting on the shaft 178.

Figure 26:
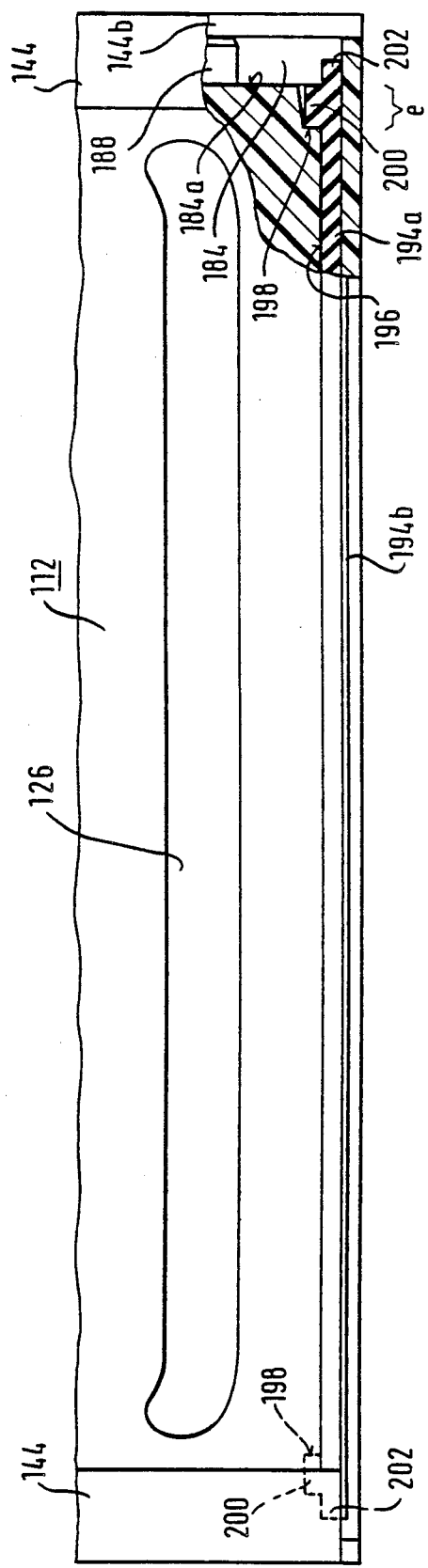
FIG. 26 represents a partial view in the direction of the arrow XXVI in FIG. 22, partially in section.

The root part 194a is inserted in an axially extending and radially inwardly open groove 196 of the cage 112 close to its gap defining face 186 in each case. The grooves 196 extend in each case as far as the axially directed faces 184a and are peripherally widened in their end sections e, so that support shoulders 198 are formed (FIG. 26). The root parts 194a of the longitudinal sealing strips 194 comprise peripherally protruding projections 200 in the axial end zones, which rest against the support shoulders 198. The longitudinal sealing strips 194 possess continuations 202 of constant profile with root part 194a and tongue part 194b, which protrude beyond the projections 200 axially in the direction towards the bottom wall 144b of the end ring 144 into the annular recess 144 so that, as represented in FIG. 23, the sealing ring 146 comes to rest on the continuation 202. The end faces 146c, facing in the peripheral direction, are adapted to the profile of the sealing strips 194. Due to the mutual abutment of the continuations 202 and of the sealing rings 146 in the region of the aperture 184 the interspace between the shaft 178 and the cage 112 is completely sealed.

Figure 27:
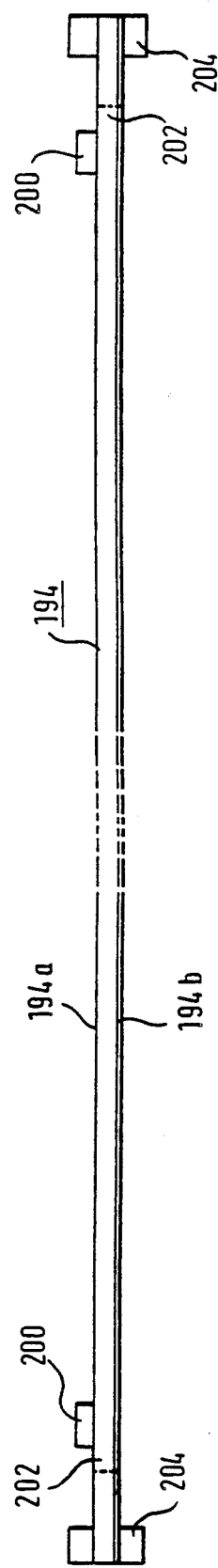
FIG. 27 represents a longitudinal sealing strip as detail of FIG. 26.

FIG. 27 shows the longitudinal sealing strip 194 before assembly. Axially outside the projections 200 grip elements 204 are fitted on the two ends of a longitudinal sealing strip 194, which grip elements render it possible, in the fitting of the longitudinal sealing strips 194, to stretch their sections placed between the projections 200 so that the projections 200 can be pushed forward over the shoulder faces 198 and supported on these. After assembly has taken place the grip elements 204 are cut away outside the continuations 202, the continuations 202 being left.

In FIG. 28 there is again seen a runner plate 14 the outer face 16 of which has already been indicated diagrammatically in FIG. 6. The outer face 16 comprises a middle rectilinearly extending longitudinal section f, which is adjoined, by way of transitional curvatures g with a radius gl of curvature in each case, by an axial longitudinal section h, which is likewise rectilinear. The longitudinal section h includes with the longitudinal section f an angle $\alpha$ of 35 minutes. The total length of the carrying ball row is designated by i. Regarding the size ratios the following is valid :

The length i of the carrier ball row amounts to about 100% to 200%, preferably about 130% to about 180% of the diameter of the shaft 178; the length of the middle longitudinal section f amounts to about 2% to about 15%, preferably about 5% to about 10% of the diameter of the shaft 178; the radius gl of curvature of the transitional rounding g amounts to more than about 100%, preferably more than about 150% and for example 167% to 300% of the diameter of the shaft 178. The angle inclination $\alpha$ amounts to about 25 to 45 minutes of angle, in the case of the example about 35 minutes of angle.

Figure 28:
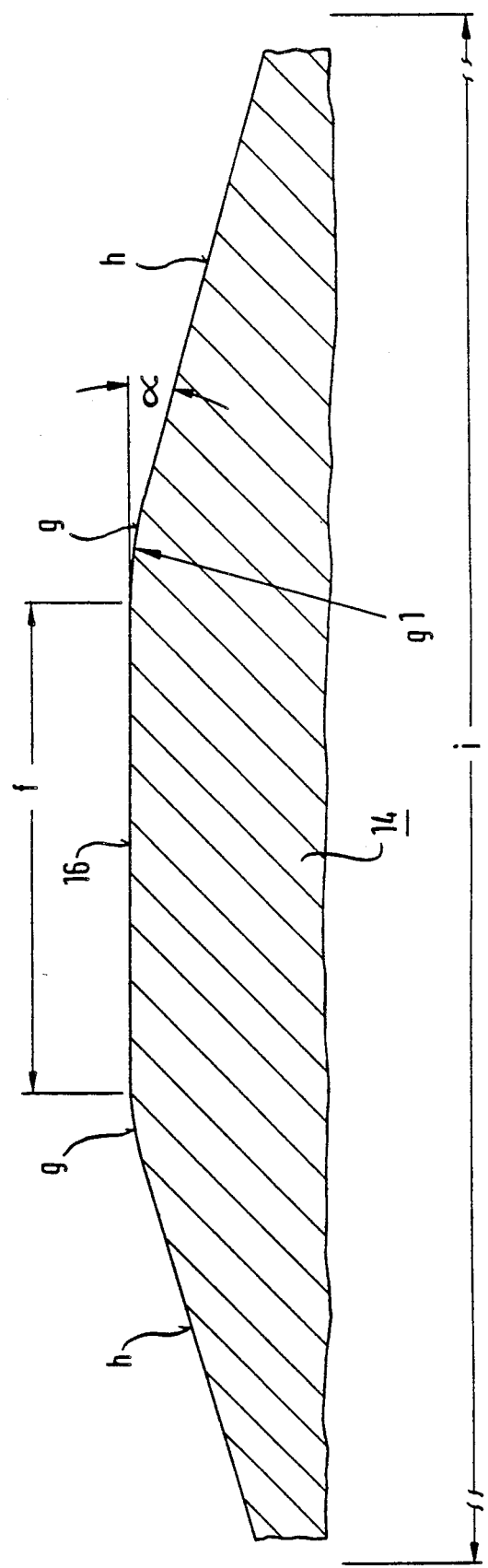
FIG. 28 represents an illustration of the runner plate according to FIG. 6.

It has appeared that if the stated dimensions are maintained a certain capacity for tilt or swing of the runner plates 14 is guaranteed, but on the other hand in normal operation due to the rectilinearity in the middle length region f the pressure per unit area compared with a surrounding bearing bore is reduced to such extent that the wear remains low. It has further appeared that if the stated dimensions are maintained in the range of the tilting movements to be expected in the case of loss of alignment between shaft axis and cage axis, the approach of diametrically mutually opposite runner plates 14 remains within acceptable limits and thus so does the pressure which the balls exert against the shaft 178 for one part and against the runner plates 14 for the other part. The form of embodiment of the runner plates according to FIG. 28 is as described above and also usable in all forms of embodiment of the linear ball bearing.

It is to be noted that the runner plates are rounded on their outer surface 16, as represented in FIG. 2, in conformity with the internal circumferential surface of a receiving bearing housing bore, so that a flat abutment of the runner plates in the region of the middle longitudinal section f on the bearing housing bore is guaranteed.

While a specific embodiment of the invention has been shown and described in detail to illustrate the application of the inventive principles, it will be understood that the invention may be embodied otherwise without departing from such principles.

The reference numerals in the claims are only used for facilitating the understanding and are by no means restrictive.

What is claimed is:

1. Linear ball bush (10) comprising a cage (12) with a cage axis and with a plurality of ball circuits,
    where each ball circuit comprises two straight ball rows (22, 24) substantially parallel to the cage axis, namely a carrier ball row (22) and a return ball row (24), and two curved ball rows (28) connecting the two straight ball rows (22,24),
    where furthermore at least one straight ball row (22,24) of a ball circuit rests radially outwards on a runner plate (14) which is inserted into a pertinent aperture of the cage (12) and possesses an outer surface (16) for abutment on an inner circumferential surface of a bearing housing bore accommodating the cage (12),
    where further a straight track section (30,32) for at least one straight ball row (22,24) of the respective ball circuit is formed on an inner surface (18) of the runner plate (14), where the respective carrier ball row (22) partially radially inwardly penetrates a slot (26) of the cage (12), in order to be able to take abutment on a shaft at least partially enclosed by the cage (12),
    where further the aperture (60) of the cage (12) possesses a charging slope (66) at least at one of its ends and approximately in alignment with the one straight track section (30,32), and/or the runner plate (14) possesses a charging bevel (74) on its inner surface in the region of at least one of its ends in approximate alignment with the one straight track section (30, 32), this charging slope (66) and/or this charging bevel (74) permitting the charging of balls (20) into the one straight track section (30, 32) when the runner plate (14) is wholly or partially lifted out of the aperture (60) at this one end.

2. Linear ball bush according to claim 1, characterised in that charging slopes (66) are provided at both ends of the aperture (60) and/or in that charging bevels (74) are provided at both ends of the runner plate (14) on the inner side thereof.

3. Linear ball busy according to claim 1, characterised in that only one carrying straight track section (30) for the carrier ball row (22) is provided on the inner surface (18) of the runner plate (14) and in that the charging slope (66) and/or the charging bevel (74) is fitted in alignment with this carrying straight track section (30).

4. Linear ball bush according to claim 1, characterised in that on the inner surface of the runner plate (14) a closed track (30, 32, 36) is formed for the ball circuit concerned, the closed track (30, 32, 36) comprising two straight track sections (30, 32), namely a carrying straight track section (30) for the carrier ball row (22) and a returning straight track section (32) for the returning ball row (24) and two curved track sections (36) connecting the straight track sections (30, 32).

5. Linear ball bush according to claim 4, characterised in that rectilinear prolongations (30a, 32a) of the straight track sections (30, 32) are continued with substantially constant profile as far as the ends of the runner plate (14), intersecting with the curved track sections (36).

6. Linear ball bush according to claim 4, characterised in that the charging slope (66) and/or the charging bevel (74) are arranged in axial alignment with the returning straight track section (32).

7. Linear ball bush according to claim 4, characterised in that the carrying straight track section (30), in relation to the outer surface of the runner plate (14), lies at a higher level and the returning straight track section (32), in relation to the outer surface (16) of the track (14), lies at a lower level, and the curved track sections (36) gradually overcome the corresponding differences of level.

8. Linear ball bush according to claim 4, characterised in that the straight track sections (30, 32) are separated from one another by a central rib (38), which may be continued with substantially constant profile as far as the ends of the runner plate (14) and is traversed by the two track sections (36).

9. Linear ball bush according to claim 1, characterised in that during the ball charging operation the end of the runner plate (14) remote from the charging point is held approximately in the operational position within the aperture (60).

10. Linear ball bush according to claim 9, characterised in that the end of the respective runner plate (14) remote from the charging station is held in the working position by a pot-shaped end ring (44) during the ball charging operation.

* * * * *

UNITED STATES PATENT AND TRADEMARK OFFICE
CERTIFICATE OF CORRECTION

PATENT NO. : 4,989,996

DATED : February 5, 1991

INVENTOR(S) : Manfred Binder, Karl-Heinz Reuss, Rainer Hofling

It is certified that error appears in the above-identified patent and that said Letters Patent is hereby corrected as shown below:

Col. 4, line 21, "pot-ring-shaped" should read --part-ring-shaped--.
Col. 4, line 50, "(now shown)" should read --(not shown)--.
Col. 5, line 18, "pot-shaped" should read --part-shaped--.
Col. 5, line 43, insert a period after "36".
Col. 5, line 45, "Jerk-free" should read --jerk-free--.
Col. 5, line 64, insert a period after "FIG. 12".
Col. 5, line 68, insert a period after "allocated".
Col. 6, line 39, "words." should read --words: --.
Col. 7, line 11, "to the" should read --of the--.
Col. 7, line 37, "1446a" should read --146a--.
Col. 7, line 41, "254" should read --24--.
Col. 8, line 31, "extend" should read --extent--.
Col. 10, line 45, "busy" should read --bush--.

Signed and Sealed this

Sixth Day of October, 1992

Attest:

DOUGLAS B. COMER

*Attesting Officer*       Acting Commissioner of Patents and Trademarks